(12) United States Patent
Jahn et al.

(10) Patent No.: US 7,111,205 B1
(45) Date of Patent: Sep. 19, 2006

(54) METHOD AND APPARATUS FOR AUTOMATICALLY REPORTING OF FAULTS IN A COMMUNICATION NETWORK

(75) Inventors: Jeffrey M. Jahn, Jupiter, FL (US); Leroy Gilbert, Wellington, FL (US); Mark Grosberg, Boca Raton, FL (US); Mark J. Flanagan, Boynton Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/551,258

(22) Filed: Apr. 18, 2000

(51) Int. Cl.
*G06F 11/00* (2006.01)

(52) U.S. Cl. .......................... 714/47; 714/48; 709/224

(58) Field of Classification Search .................... 714/4, 714/47, 43, 48, 57; 709/224, 223, 22
See application file for complete search history.

(56) References Cited

U.S. PATENT DOCUMENTS

| | | | | |
|---|---|---|---|---|
| 5,619,656 A * | 4/1997 | Graf | .......................... | 709/224 |
| 5,666,481 A * | 9/1997 | Lewis | ......................... | 709/224 |
| 5,777,549 A * | 7/1998 | Arrowsmith et al. | ........ | 340/506 |
| 5,968,189 A * | 10/1999 | Desnoyers et al. | ............ | 714/47 |
| 6,006,016 A * | 12/1999 | Faigon et al. | .................. | 714/48 |
| 6,038,288 A * | 3/2000 | Thomas et al. | ........... | 379/15.01 |
| 6,141,777 A * | 10/2000 | Cutrell et al. | ................... | 714/4 |
| 6,205,563 B1 * | 3/2001 | Lewis | .......................... | 714/47 |
| 6,269,330 B1 * | 7/2001 | Cidon et al. | ................... | 714/47 |
| 6,282,192 B1 * | 8/2001 | Murphy et al. | ............. | 370/352 |
| 6,353,902 B1 * | 3/2002 | Kulatunge et al. | .......... | 714/712 |
| 6,430,712 B1 * | 8/2002 | Lewis | .......................... | 714/47 |
| 6,442,448 B1 * | 8/2002 | Finley et al. | ................ | 700/231 |
| 6,470,385 B1 * | 10/2002 | Nakashima et al. | ........ | 709/224 |
| 6,510,350 B1 * | 1/2003 | Steen et al. | ..................... | 700/9 |
| 6,513,129 B1 * | 1/2003 | Tentij et al. | ................... | 714/48 |
| 6,515,967 B1 * | 2/2003 | Wei et al. | ..................... | 370/244 |
| 6,532,554 B1 * | 3/2003 | Kakadia | ........................ | 714/43 |
| 6,598,183 B1 * | 7/2003 | Grieco et al. | .................. | 714/43 |
| 6,782,420 B1 * | 8/2004 | Barrett et al. | ................ | 709/223 |
| 2002/0019867 A1 * | 2/2002 | Pulkkinen | .................... | 709/223 |
| 2002/0184575 A1 * | 12/2002 | Landan | ......................... | 714/47 |
| 2003/0023722 A1 * | 1/2003 | Vinberg | ....................... | 709/224 |
| 2005/0030907 A1 * | 2/2005 | Lou et al. | .................... | 370/254 |

* cited by examiner

*Primary Examiner*—Robert Beausoliel
*Assistant Examiner*—Marc Duncan (57) ABSTRACT

An improved method, apparatus and computer system for automatically reporting of faults in a telephonic network is described. When a network fault is detected, a determination is made by a fault analyzer whether or not the detected fault is a reportable fault. If the detected fault is a reportable fault, then an alarm report based upon the reportable fault is generated which is then distributed based upon a distribution list. The distribution list includes only those destination addresses associated with the reportable fault. The alarm report in distributed to any number and kind of communications devices such as, a pager, an email server, and a control console.

15 Claims, 5 Drawing Sheets

METHOD AND APPARATUS FOR AUTOMATICALLY REPORTING OF FAULTS IN A COMMUNICATION NETWORK

BACKGROUND OF THE INVENTION

1. Field of Invention

The invention generally relates to the field of communications. More particularly, the invention is directed to methods and apparatus for automatically reporting faults in a distributed communication network.

2. Description of Relevant Art

Telephony is the technology associated with the electronic transmission of voice, fax, or other information between distant parties using systems historically associated with the telephone. With the arrival of computers and the transmittal of digital information over telephone systems and the use of radio to transmit telephone signals, the distinction between telephony and telecommunication has become difficult to find. Moreover, with the advent of Internet telephony (i.e., the use of the Internet rather than the traditional telephone company infrastructure and rate structure to exchange spoken or other telephone information), the Internet has now made available (at local phone connection rates) international or other long-distance calls that are much less expensive than those made through the traditional call arrangement.

This great savings in communication costs has, in turn, prompted many companies to configure their telephone systems into LAN (local area network) type telephony systems that are ultimately coupled to and communicate with the Internet by way of a computer based bidirectional gateway, also referred to as a "telephony intranet server", or TIS unit. Currently, nearly all business telephone systems are based on a centralized, or star network, design where all telephones and trunk lines converge on a single switching point, typically a PBX or in some cases a programmable switch. Despite its popularity, there are a lot of problems with this kind of network architecture. These problems include, 1) if the central switch dies, the phone network is dead, 2) each switching product is typically usable only within a specific size range in that scaling to the next level means throwing the old switch out and buying a new one, and 3) a closed architecture where everything from the switch to individual telephone handsets are proprietary thereby limiting customer choices.

For these and other reasons, distributed telephone systems which use IP networks to route calls between nodes have started to become more attractive to businesses. Typically, the conventional distributed telephone system use IP based or ATM based LAN/WAN cabling to connect many small systems into a single super-system resulting in a fully distributed telephone network which can scale to an essentially infinite port capacity. In addition, the conventional distributed telephone system has many redundant components that will support many types of handsets, from standard analog sets to standards compliant IP telephones running H.323 over Ethernet.

Unfortunately, however, the distributed nature of the distributed network system makes the ability to identify and locate a malfunctioning component within the network very time consuming and costly. This problem of determining the location and type of malfunction is compounded as the distributed network increases in size and complexity greatly increasing the potential downtime for those affected systems.

Therefore, what is desired is an improved method and apparatus for efficiently identifying both a malfunctioning component and the nature of the malfunction in a distributed telecommunications system.

SUMMARY OF THE INVENTION

Broadly speaking, the invention relates to an improved method, apparatus and computer system for automatically reporting of faults in a telephonic network. In one aspect of the invention, a method of generating an alarm report for a distributed communication system is disclosed. When a network fault is detected, a determination is made by a fault analyzer whether or not the detected fault is a reportable fault. If the detected fault is a reportable fault, then an alarm report based upon the reportable fault is generated which is then distributed based upon a distribution list.

In another embodiment of the invention, an apparatus for automatically reporting detected network operation faults in a distributed communication network is disclosed. The apparatus includes a fault detector unit arranged to detect the network operation fault coupled to a fault analyzer for determining whether or not the detected network operation fault is a reportable network operation fault. An alarm notice generator unit coupled to the fault analyzer provides a reportable network fault alarm notice based upon the reportable network operation fault which a fault solution analyzer unit coupled to the alarm notice generator unit uses to generate a fault solution report based upon a fault analysis which is then displayed for viewing by a user.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

This invention is generally directed to a system for automatically identifying the location and nature of a malfunction in a distributed communication system. In a preferred embodiment, the distributed communication system is a local area network (LAN) based telephony system, also referred to as telephony over LAN (ToL)

A monitoring system included in a computer based gateway, also referred to as a telephony intranet server (TIS), is arranged to monitor selected communication paths between Private Branch Exchanges (PBXs) and an external distributed network of computers, such as the Internet. Included in the TIS is a fault detector arranged to detect a particular fault that is then reported to a fault analyzer coupled thereto. The fault analyzer, in turn, ascertains whether or not the detected fault is a reportable type fault based upon predetermined threshold and operation characteristics. An alarm report is then generated detailing location, type, time, and any other pertinent information regarding the detected fault. The alarm report is then transmitted, in a preferred embodiment, in real time to personnel whose responsibility it is to respond to and repair such faults using the information provided in the alarm report. Typically, the alarm report can be emailed using a standard SMTP email server, or the alarm report can be posted to a convention textual pager system. In any case, the alarm report substantially reduces the time involved in identifying, locating and ultimately repairing the detected fault.

The invention will now be described in the context of telephony over LAN system, however, it should be noted that the invention can be used for other types of communications systems. Such other systems include wireless conferencing systems, and the like.

Figure 1:
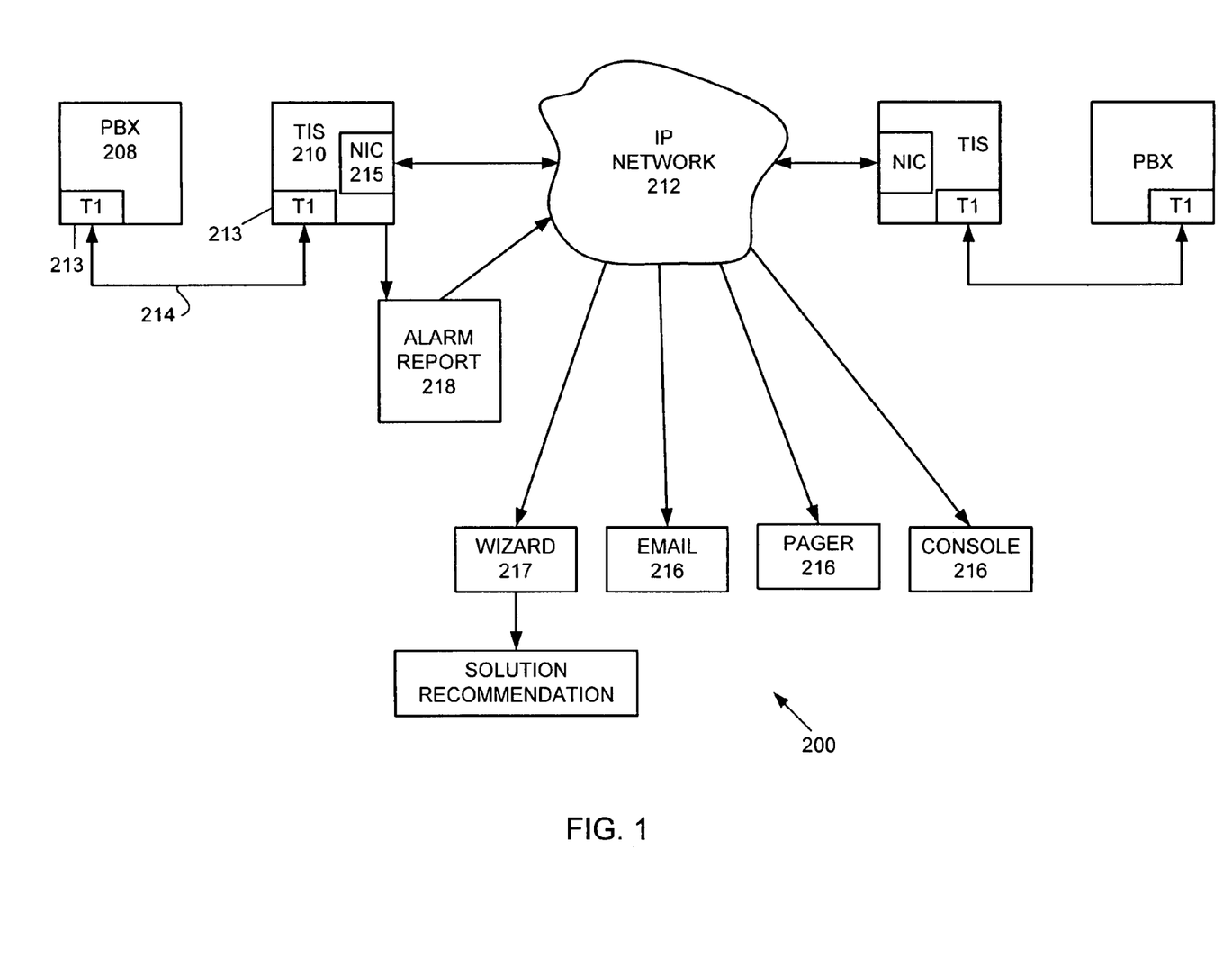
FIG. 1 shows a schematic block diagram of a telephone over LAN (ToL) system of the type employed in accordance with one embodiment of the invention.

Referring now to FIG. 1, a schematic block diagram of a telephone over LAN (ToL) system 200 of the type employed with the invention is shown. The ToL system 200 is preferably an International Telecommunications Union (ITU)-Telephony Standardization Sector (TSS) compliant system. The ToL system 200 includes a number of PBXs that are each connected to an associated TIS via a standard T1 (analog or ISDN) interface. For example, a PBX 208 is coupled to a TIS 210 by way of a T1 interface 213. The TIS 210, in turn, digitally interfaces the PBX 208 to a distributed network of computers 212. In those cases where the distributed network 212 is the Internet, the ToL system 200 can be configured as an IP (Internet Protocol) telephony type system. As well known in the art, when configured as an IP telephony system, the ToL system 200 uses the Internet Protocol's packet-switched connections to exchange voice, fax, and other forms of information that have traditionally been carried over the dedicated circuit-switched connections of the public switched telephone network (PSTN).

In some embodiments, the PBXs can be replaced by IP capable telephones or by any personal communication server (PCS) such as a computer that is capable of supporting hardware and software that is required to enable an associated client-operator to appear in a video conference. This includes video cameras, microphones, along with the required encoding, decoding, and communications software and hardware. In this way, the operator of any of the PCSs can establish and connect to a video conference using a graphical client interface (GUI) displayed on the respective PCS. In those cases the system 200 is used to conduct an audio-video conference, each conferee interfaces to the system 200 by a way of the respective PCS that contains a video Coder/Decoder (CODEC) board. Audio-video conferences are set up according to the CODEC capabilities of the participating conferees or according to a minimum CODEC capability determined to be in effect for the conference.

In a preferred embodiment, the system 200 supports ITU recommended standards. One such standard is referred to the H.323 protocol that covers multimedia over non-guaranteed bandwidth packet switched networks. H.323 is an umbrella recommendation from the International Telecommunications Union (ITU) that sets standards for multimedia communications over Local Area Networks (LANs) that do not provide a guaranteed Quality of Service (QoS). These networks dominate today's corporate desktops and include packet-switched TCP/IP and IPX over Ethernet, Fast Ethernet and Token Ring network technologies. The Internet and LANs using TCP/IP and SPX/IPX protocols running over Ethernet or Token Ring are examples of packet switched networks with non guaranteed bandwidth. The H.323 protocol is a set of protocols that sits on top TCP/IP and provides interoperability among different vendors and platforms of products for multimedia communication applications that will run over LANs and the Internet. The H.323 standard specifies call control, multimedia management, and bandwidth management for point-to-point and multipoint conferences. H.323 also specifies protocols and elements that allow communication among LANs and other networks such as the PSTN.

As well known in the art, LAN telephony requires an adapter to convert the telephony signal into a data signal using a software application (e.g. MS NetMeeting) or a device called a LAN phone that looks and functions like a phone but is essentially a computer. In particular, when configured to operate as an IP telephony system, telephone traffic in the ToL system 200 is transmitted via a T1 link 214 from the PBX 208 to the TIS 210 where it is packetized into, for example, Ethernet compliant data packets. The packetized telephonic data is then assigned appropriate IP addresses corresponding to the locations of selected receiving destinations in the Internet 212.

In a preferred embodiment, the TIS 210 monitors the flow of data between the PBX 208 and the Internet 212 for potential fault conditions. Such fault conditions include hardware failures, such as failure of the T1 interface boards 213 or a Network Interface Card (NIC) 215, software failures (such as memory and resource exhaustion) as well as traffic statistics, such as overload conditions. In one implementation of the invention, a list of fault conditions can be stored locally in a memory device (not shown). In this way, the number and type of out of compliance events to be monitored can updated and revised as needed.

If the TIS 210 determines that a fault has in fact occurred, then for those faults determined to be of a nature as to have the potential to cause substantial system downtime as reflected in the list of fault conditions, an alarm report 218 is generated which is then forwarded in real time, if desired, to any number of communication devices 216 based upon, for example, a predetermined distribution list. The communication devices 216 can include email, paging systems, control consoles, and the like. In this way, those personnel who can most readily repair the malfunction are immediately notified such that system downtime is minimized. In furtherance of the goal of minimizing system downtime, the alarm report 218 can be constructed to include such information as type and location of malfunction as well as a time stamp indicating when the TIS 210 first detected the malfunction. In some implementations, a history of system malfunctions can be stored in an event log that can take the form of a local memory device, or can also be configured as a remote memory devices contained within, for example, a server computer suitable for maintaining large scale systems.

An enhancement to the system includes a "wizard" 217. The wizard is programmed to analyze the alarm report and recommend a solution for the problem. An example of this is the ability of the wizard to compare the software version of the TIS 210 which is reporting a software failure with a list of software versions which are current for the product, and with a list of previously reported failures and their resolutions. The wizard 217 can thereby decide that the reporting TIS 210 needs a software patch or upgrade, and the wizard 217 can transmit the patch or upgrade to the reporting TIS 210, which can apply the fix to solve the problem. Another example is the ability of the wizard 217 to take a report of a hardware failure, and search an inventory of hardware components in stock at the service center, and order replacement parts to be made available to service personnel who will respond to the alarm report after receiving simultaneous notification of the failure via their pagers.

Figure 2:
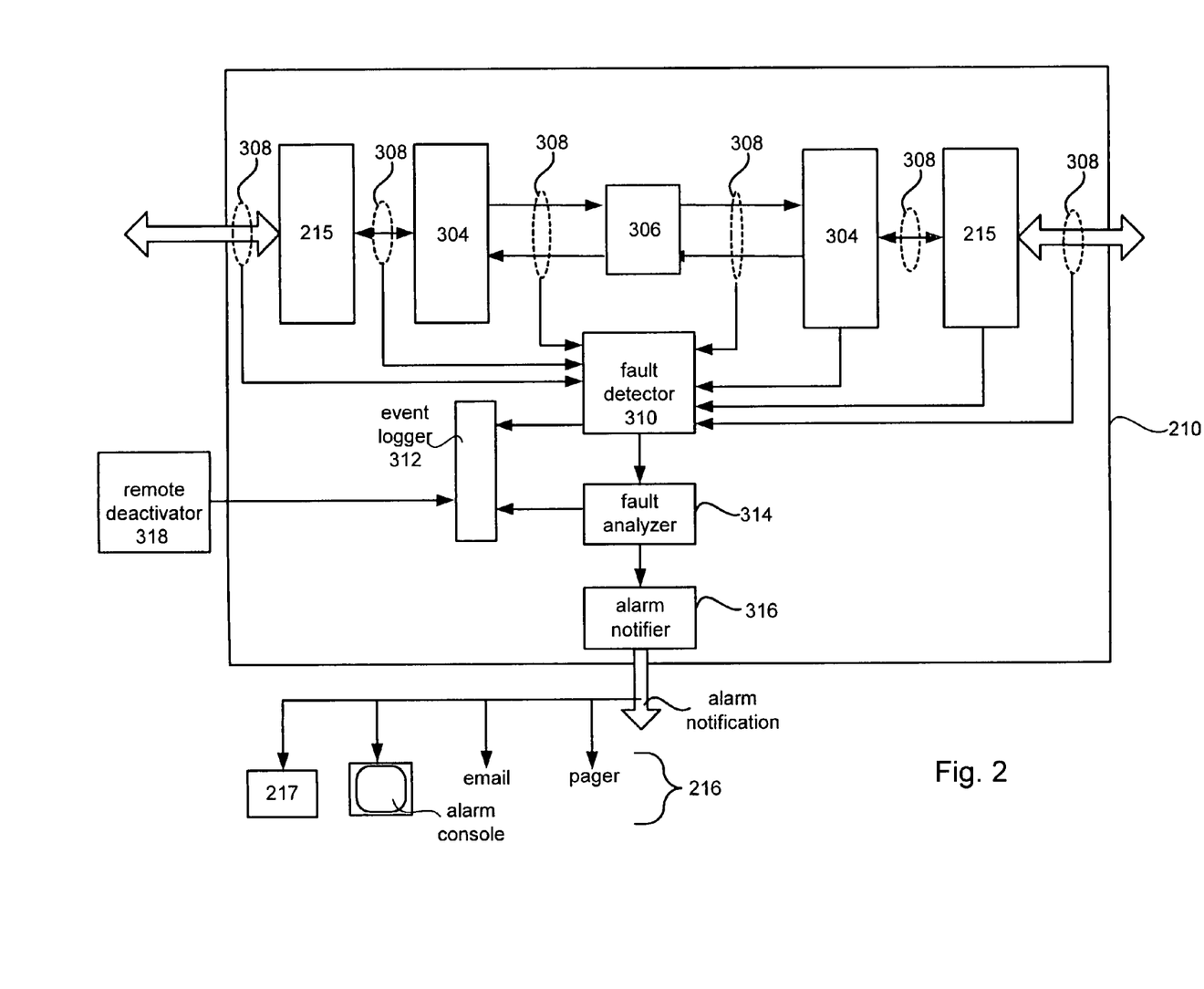
FIG. 2 shows a particular implementation of the TIS in accordance with an embodiment of the invention is illustrated.

Referring now to FIG. 2, a particular implementation of the TIS 210 in accordance with an embodiment of the invention is illustrated. The TIS 210 includes the NIC interface 215 that is arranged to receive telephonic data from the network 212 and pass it to a packetizer 304 configured to packetize the received data into corresponding data packets. In those cases where the TIS 210 is coupled to, for example, an IP based network, a routing block 306 provides a destination address to each of the packets according to a dialed up destination configured by the originating device. Once packetized and properly addressed, the packet is then passed to the IP network 212 that in some cases can be the Internet.

At various points in the TIS 210, various monitoring nodes 308 are used to continuously monitor various aspects of the flow of data between the NIC 215 and the Internet 212. In some embodiments, the monitoring devices 308 can be used to monitor specific operating characteristics typical of such fault modes as software failures (such as memory and resource exhaustion) as well as traffic statistics, such as overload conditions. In the described embodiment, each of the monitoring nodes 308 is coupled to a fault detector unit 310 that is used to ascertain whether or not the detected monitor operating characteristics fall within an acceptable operating domain. In a preferred embodiment, these operating characteristics can be based upon historical operating data or can be provided by systems manufacturers. In any case, if the fault detector unit 310 determines that one or more of the monitoring nodes 308 has captured a fault; the time, date, and location of the observed fault is recorded in an event logger 312. Substantially simultaneously, the fault information is passed to a fault analyzer unit 314 that determines whether or not the observed fault is one that should be flagged. It should be noted that, in some cases, it has been determined that not all observed faults are significant enough to warrant immediate attention. By limiting reportable faults to only those that present a clear and present risk to substantial system downtime eliminates the possibility of "information overload" since only those events deemed important enough for immediate attention are flagged.

Similarly, in some cases, multiple events that are in fact based upon a single event can be recognized as such. In these cases, only a single alarm notification is generated, again, avoiding information overload that can have the effect of confusing, or otherwise, delaying a repair technician's response time.

Once the fault analyzer 314 has ascertained that the observed fault is a reportable fault, an alarm notifier 316 formats and delivers an alarm report to any number and type of the communication devices 216. Such communication devices include, but are not limited to, pagers, email, control consoles, etc. It should be noted that in some cases, a remote deactivator 318 can be used to deactivate the event logger 312. Those situations where the event logger 312 is deactivated is when, for example, the error logger 312 runs the risk of being overloaded with data such that important event data is subsequently overwritten or otherwise not properly logged and recorded.

Figure 3:
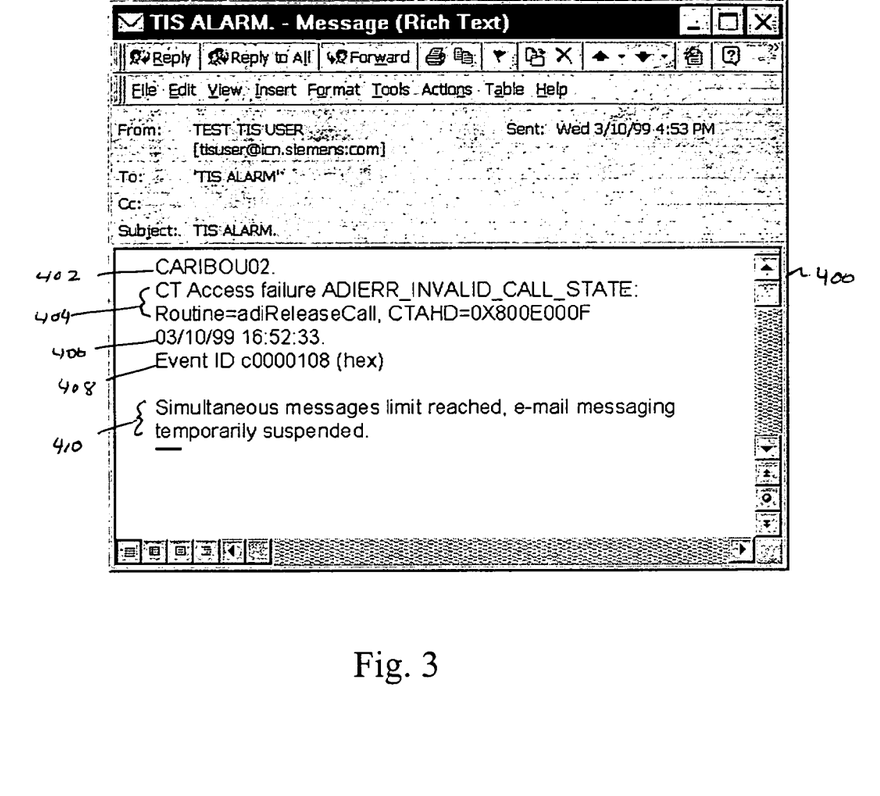
FIG. 3 shows an exemplary alarm report in accordance with an embodiment of the invention.

In the case where an email is the choice of communication device, the alarm report can take the form of an alarm report 400 as shown in FIG. 3 in accordance with an embodiment of the invention. As shown, the email alarm report 400 includes a source line 402 that identifies a particular TIS unit, an event identifier 404, a date and time stamp 406 indicating the date and time when the particular event occurred, an event id code 408, and a summary 410.

Figure 4:
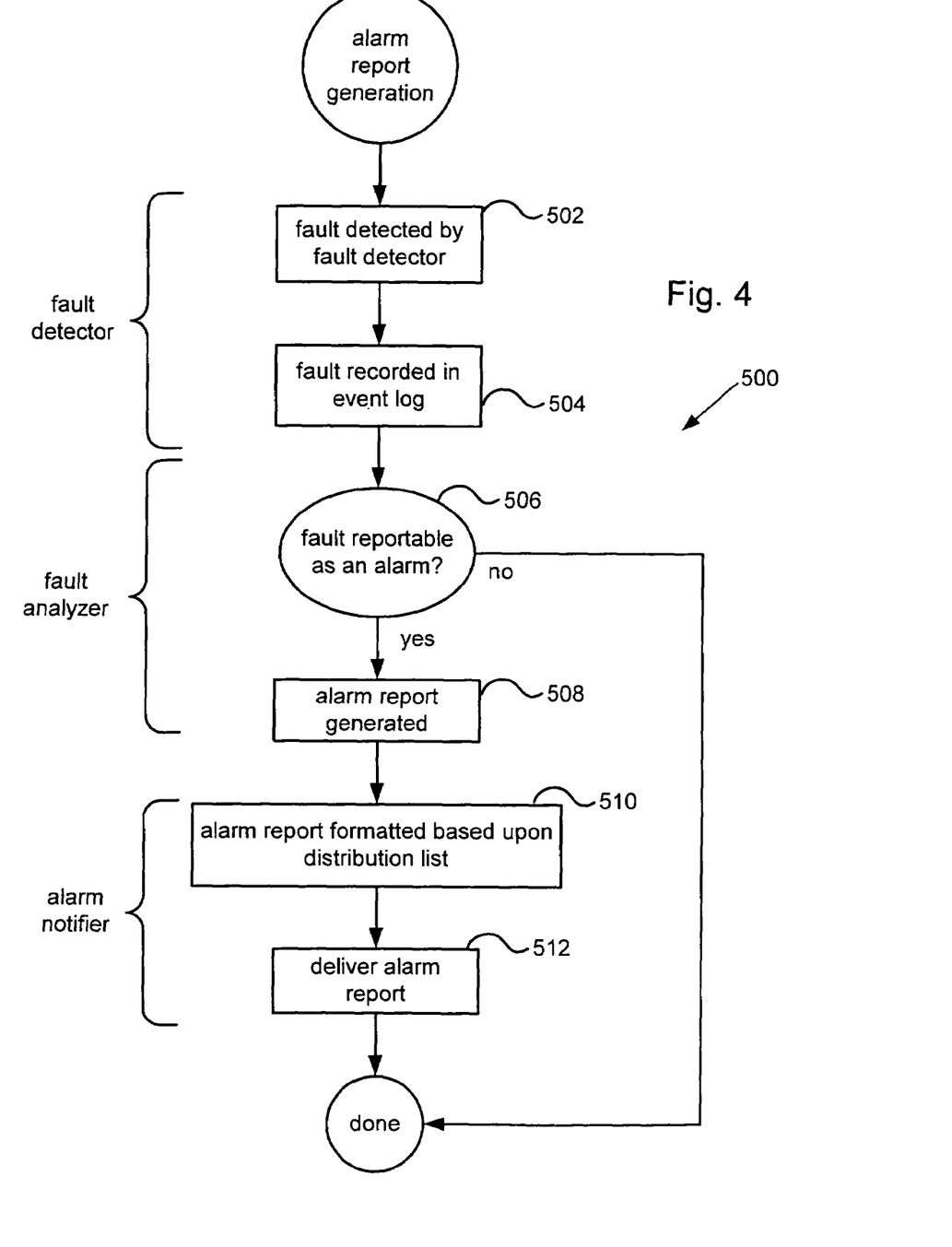
FIG. 4 shows a flow chart detailing a process for generating an alarm report in accordance with an embodiment of the invention.

Referring now to FIG. 4, a flow chart detailing a process 500 for generating an alarm report in accordance with an embodiment of the invention is shown. The process 500 begins at 502 by a fault being detected by the fault detector. At 504, the fault detector sends a copy of the fault with any appropriate additional information such as time and date to an event logger. The event logger can take the form of a local memory device such as a disk drive or can even be located in a remote device such as a centrally located server type computer or other such data storage devices. In this way, the inventive TIS can be used in both large and small scale distributed communications systems. Substantially simultaneously with logging the event, a fault analyzer determines whether or not the observed fault is a reportable fault at 506. The criteria used by the fault analyzer can be stored in local memory or can be stored in a remote location where it can be more readily updated to reflect the most current operating conditions. In the case where the fault analyzer determines that the event is not reportable, then processing ends (the event may or may not be purged from the event logger), otherwise, a corresponding alarm report is generated by an alarm report generator 508. The alarm report can include information such as time and place of the observed fault as well as the nature of the fault itself.

At 510, the alarm report is then properly formatted based upon the designated type of communication device for which it is intended to be delivered at 512. In some cases, the alarm report takes the form of an SMTP compliant email, in other cases, it takes the form of a textual page broadcast by any number of conventional paging services, such as PageNet™. In some cases, a distribution list is used to deliver the alarm report, in other cases, the alarm report can be sent to a single site, such as a command and control console located, in for example, a central office or other such facility. In this way, those entities determined to be most likely to be able to solve a particular problem can be specifically notified of a particular problem. For example, there can be any number of distribution lists associated with any number of particular reportable faults such that only certain entities are notified for certain of the faults while others are not.

Figure 5:
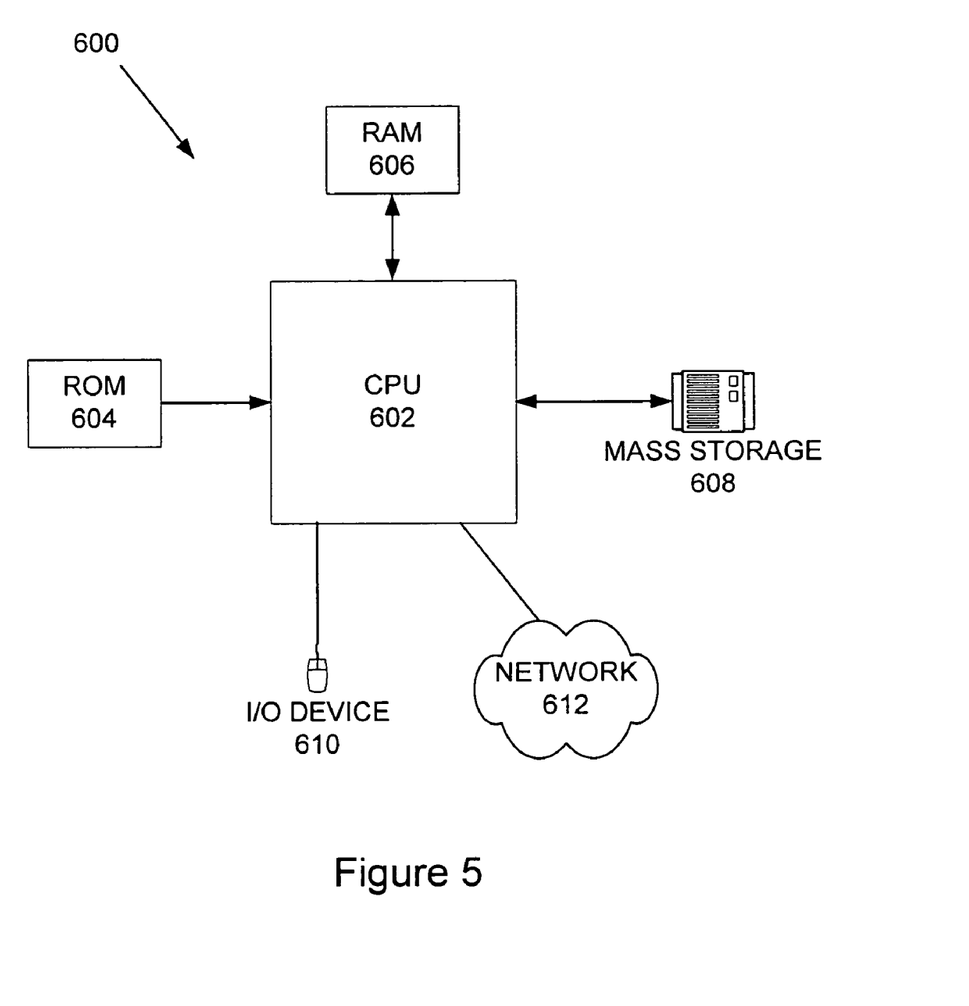
FIG. 5 illustrates a typical, general-purpose computer system suitable for implementing the present invention.

FIG. 5 illustrates a typical, general-purpose computer system 600 suitable for implementing the present invention in the form of a personal communications system. The computer system 600 includes any number of processors 602 (also referred to as central processing units, or CPUs) that are coupled to memory devices including primary storage devices 604 (typically a read only memory, or ROM) and primary storage devices 606 (typically a random access memory, or RAM).

Computer system 600 or, more specifically, CPUs 602, may be arranged to support a virtual machine, as will be appreciated by those skilled in the art. As is well known in the art, ROM acts to transfer data and instructions uni-directionally to the CPUs 602, while RAM is used typically to transfer data and instructions in a bi-directional manner. CPUs 602 may generally include any number of processors. Both primary storage devices 604, 606 may include any suitable computer-readable media. A secondary storage medium 608, which is typically a mass memory device, is also coupled bi-directionally to CPUs 602 and provides additional data storage capacity. The mass memory device 608 is a computer-readable medium that may be used to store programs including computer code, data, and the like. Typically, mass memory device 608 is a storage medium such as a hard disk or a tape which generally slower than primary storage devices 604, 606. Mass memory storage device 608 may take the form of a magnetic or paper tape reader or some other well-known device. It will be appreciated that the information retained within the mass memory device 608, may, in appropriate cases, be incorporated in standard fashion as part of RAM 606 as virtual memory. A specific primary storage device 604 such as a CD-ROM may also pass data uni-directionally to the CPUs 602.

CPUs 602 are also coupled to one or more input/output devices 610 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 602 optionally may be coupled to a computer or telecommunications network, e.g., an internet network or an intranet network, using a network connection as shown generally at 612. With such a network connection, it is contemplated that the CPUs 602 might receive information from the network, or might output information to the network in the course of performing the above-described method steps. Such information, which is often represented as a sequence of instructions to be executed using CPUs 602, may be received from and outputted to the network, for example, in the form of a computer data signal embodied in a carrier wave. The above-described devices and materials will be familiar to those of skill in the computer hardware and software arts.

While the present invention has been described as being used with a distributed communication system, it should be appreciated that the present invention may generally be implemented on any distributed network. Therefore, the present examples are to be considered as illustrative and not restrictive, and the invention is not to be limited to the details given herein, but may be modified within the scope of the appended claims along with their full scope of equivalents.

What is claimed is:

1. A method of automatically reporting a detected network fault in a distributed communication network, comprising:
   detecting fault conditions indicated from data flow between a local communication network and a data network;
   determining whether or not each of the detected fault conditions indicates a reportable network fault, wherein the reportable network fault is limited to only those hardware failures and software failures included in a reportable fault list that present a clear and present risk of causing substantial downtime;
   generating an alarm report based upon the reportable network fault;
   distributing the alarm report based upon a distribution list in real time; and
   generating a solution recommendation based upon the reportable network fault.

2. A method as recited in claim 1, further comprising:
   logging the reportable network fault to an event logger.

3. A method as recited in claim 2, wherein the detecting comprises:
   monitoring the data flow between said local communication network and said data network;
   generating a fault signal automatically upon detection of an out of compliance network event;
   automatically sending the fault signal to a fault detector; and
   automatically logging the out of compliance event to the event logger.

4. A method as recited in claim 3, wherein the determining comprises:
   determining whether or not the out of compliance event is included in the reportable fault list;
   designating the event as the reportable fault when the event is determined to be included in the reportable fault list.

5. A method as recited in claim 4, wherein the alarm report includes fault type, location of malfunction and a time stamp and the distribution list includes destination addresses associated with the reportable fault.

6. A method as recited in claim 5, wherein the distributing comprises:
   determining a fault report recipient based upon the distribution list; and
   sending the fault report to the determined fault report recipient by way of a fault report communication device.

7. A method as recited in claim 6, wherein the fault communication report device is selected from a group comprising: a pager, an email server, a display console, and a telephone.

8. A method as recited in claim 1, wherein the alarm report includes fault type, location of malfunction and a time stamp.

9. An apparatus coupled to a distributed communication network for automatically reporting detected network operation faults, comprising:
   a telephony intranet server (TIS) coupling a private communication network to a data network in said distributed communication network, said TIS monitoring the flow of data between said private communications network and said data network;
   a fault detector unit in said TIS, said fault detector unit detecting faults indicated in said flow of data;
   a fault analyzer coupled to the fault detector unit arranged to ascertain whether or not each detected network operation fault is a reportable network operation fault wherein the reportable network operation fault is limited to only those detected faults that present a clear and present risk of causing substantial downtime, wherein only hardware failures and software failures are designated as events reportable as network operation faults and the fault analyzer determines whether or not each event is a hardware failure or a software failure included in a reportable fault list and designates the event as reportable when the event is determined to be included in the reportable fault list;

an alarm notice generator unit coupled to the fault analyzer configured to generate a reportable network fault alarm notice based upon said each reportable network operation fault;

a fault solution analyzer unit coupled to the alarm notice generator unit arranged to generate a fault solution report based upon a fault analysis; and a display unit arranged to display the alarm notice and the fault solution report.

10. An apparatus as recited in claim 9, further comprising:
an event logger coupled to the fault analyzer unit arranged to record each reportable network operation fault.

11. An apparatus as recited in claim 10, wherein the display unit is part of a fault report communication device that provides real time notification of the reportable network operation fault to a user.

12. An apparatus as recited in claim 11, wherein the fault communication report device is selected from a group comprising: a pager, an email server, a display console, and a telephone.

13. An apparatus as recited in claim 12, wherein the distributed communication network is a telephony over LAN (ToL) network.

14. An apparatus as recited in claim 9, wherein the alarm notice includes fault type, location of malfunction and a time stamp.

15. An apparatus coupled to a distributed communication network for automatically reporting detected network operation faults, comprising:

a telephony intranet server (TIS) coupling a private communication network to a data network in said distributed communication network, said TIS monitoring the flow of data between said private communications network and said data network;

a fault detector unit in said TIS, said fault detector unit detecting network operation faults indicated in said flow of data, said fault detector designating only hardware failures and software failures as detected network operation faults;

a fault analyzer coupled to the fault detector unit arranged to ascertain whether or not each detected network operation fault is a reportable network operation fault, the fault analyzer determining whether or not each network operation fault is a hardware failure or a software failure included in a reportable fault list and designating each included said network operation fault as reportable, wherein the reportable network operation fault is limited to only those detected faults that present a clear and present risk of causing substantial downtime;

an alarm notice generator unit coupled to the fault analyzer configured to generate a reportable network fault alarm notice based upon said each reportable network operation fault;

a fault solution analyzer unit coupled to the alarm notice generator unit arranged to generate a fault solution report based upon a fault analysis; and a display unit arranged to display the alarm notice and the fault solution report.

* * * * *